TRANSISTOR DEFLECTION SYSTEM

Filed June 6, 1963 2 Sheets-Sheet 1

INVENTOR.
BRIAN E. ATTWOOD
BY
Frank R. Trifari
AGENT

April 19, 1966 B. E. ATTWOOD 3,247,419

TRANSISTOR DEFLECTION SYSTEM

Filed June 6, 1963 2 Sheets-Sheet 2

INVENTOR.
BRIAN E. ATTWOOD
BY
Frank R. [signature]
AGENT

United States Patent Office 3,247,419
Patented Apr. 19, 1966

3,247,419

TRANSISTOR DEFLECTION SYSTEM

Brian Ernest Attwood, Burstow, near Horley, Surrey, England, assignor to North American Philips Company, Inc., New York, N.Y., a corporation of Delaware Filed June 6, 1963, Ser. No. 285,918
Claims priority, application Great Britain, July 5, 1962, 25,845/62
15 Claims. (Cl. 315—27)

Figure 1:
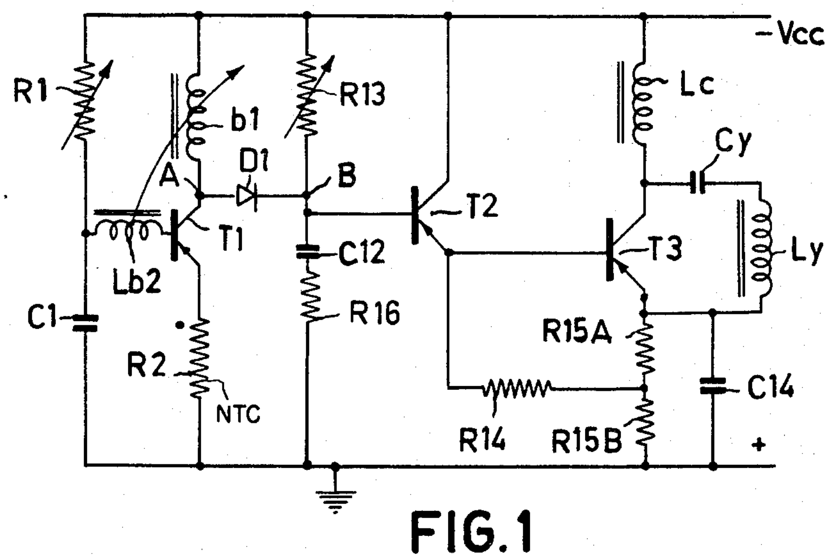

This invention relates to a vertical deflection circuit-arrangement comprising in combination, a transistor amplifier output stage having an output circuit coupled to a deflection coil, a charge network including a capacitor for producing a sawtooth control voltage for said transistor, an oscillator having a discharge circuit connected across said capacitor for periodically discharging the capacitor during flyback periods, said discharge circuit employing as its switching element a semi-conductor device, a D.C. coupling from said charge network to the base of the output transistor which is adapted to transfer substantially unaltered the voltage level and the wave form of the sawtooth voltage developed across the charge capacitor, a direct, symmetrically conducting D.C. connection from the said oscillator circuit to the said charge network which D.C. coupling constitutes part of the said discharge circuit, and means comprising the said discharge circuit and the D.C. coupling for fixing the base voltage of the output transistor at a fixed voltage level at the beginning of each stroke, a residual voltage equal to the voltage drop across the resistors in the said discharge circuit occurring at the start of the stroke due to the current that has passed through said discharge circuit at the end of the preceding flyback.

A serious problem with a deflection circuit-arrangement of the type outlined above is that it is difficult to cut-off the transistor amplifier output stage during flyback due to the D.C. coupling between the charge network and said transistor.

It has previously been suggested to bring about said cutting-off by including in the discharge circuit of the capacitor an additional winding which is inductively coupled with a coil in the collector circuit of the output transistor. A pulse is induced in said winding during flyback for cutting-off the transistor output stage.

However, in the deflection circuit-arrangement according to the invention, said problem is solved without providing an additional winding and for this purpose the arrangement is characterised in that, in order to compensate for the residual voltage occurring and thus permit the output stage to be cut-off during flyback, a series-resistor is included in the discharge circuit in series with the capacitor and the emitter circuit of the output transistor. The output transistor is circuited in emitter-base connection and its emitter circuit includes the parallel combination of a further resistor and a further capacitor having a time constant which is long relative to the period of the deflection signal produced, or about equal thereto.

It is to be noted that it is known per se to include in the discharge circuit a resistor in series with the capacitor. In this case, however, the charge network is A.C. coupled to the output stage so that the D.C. component as it were does not reach the output stage and the pulse developed during flyback across the resistor connected in series with the capacitor can penetrate the cut-off range of the output stage. This is not the case with D.C. coupling due to the D.C. component being transferred. Consequently, the provision of the said series-resistor alone is not sufficient to bring about cut-off. With D.C. coupling it is therefore necessary to include an RC-network in the emitter circuit of the output transistor which is circuited in emitter-base connection, which RC-network has a time constant comparatively long relative to the cycle of the deflection signal. A substantially constant direct-voltage is developed across said RC-network which serves as a bias potential for the transistor and together with the said pulse across the series-resistor, brings about cut-off during flyback.

According to a further embodiment of the invention, it is also possible to include the RC-network of the emitter circuit in the discharge circuit. In fact, in this case the RC-network fulfils the function of a voltage source for the rapid discharge of the charge capacitor during the flyback. This affords, in addition to the advantage of a lower residual voltage $V_r$ of the capacitor at the end of the flyback period, the additional advantage that a very large discharge current is passed through the series-resistor resulting in a much larger pulse being set up across it. Said pulse alone is thus capable of exceeding the low residual voltage at any moment of the flyback and thus cause the output transistor, and also any amplifier that may be interposed, to be completely cut-off during flyback.

Figure 3:
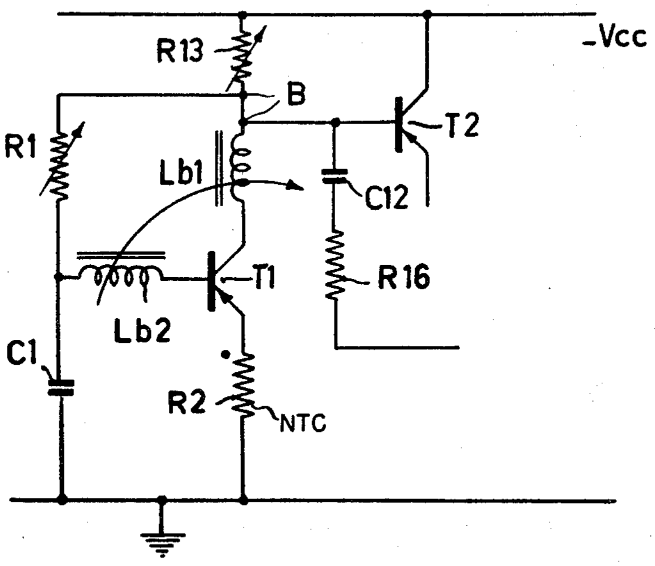
Figure 2:
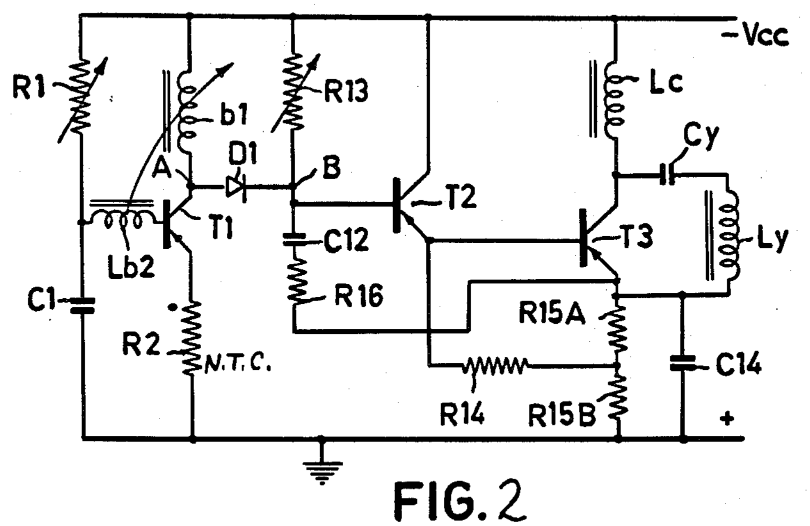

In order that the invention may be readily carried into effect, it will now be described in detail, by way of example, with reference to the accompanying diagrammatic drawing, in which:

FIG. 1 shows a first embodiment of a vertical deflection circuit-arrangement according to the invention, FIG. 2 shows a second embodiment thereof, and FIG. 3 shows a modification of the blocking oscillator circuit.

In the embodiment shown in FIG. 1, a transistor $T_1$ is connected as a blocking oscillator for the periodic discharge of a capacitor $C_{12}$ which constitutes, together with a variable resistor $R_{13}$, the charge network proper. It is thus possible to charge the capacitor $C_{12}$ through resistor $R_{13}$ from a direct-voltage source the negative terminal of which, indicated by $-V_{cc}$ in FIG. 1, is connected to one end of resistor $R_{13}$.

The discharge circuit of the capacitor $C_{12}$ comprises a diode $D_1$, transistor $T_1$, a resistor $R_2$, which is of the negative temperature coefficient (N.T.C.) type and serves for the temperature compensation of transistor $T_1$, and the connection between earth and a resistor $R_{16}$, and the resistor $R_{16}$ itself.

The frequency of the substantially sawtooth voltage set up across capacitor $C_{12}$ is determined by the blocking oscillator comprising in addition to transistor $T_1$, the transformer constituted by magnetically-coupled windings $L_{b1}$ and $L_{b2}$, a variable resistor $R_1$ and a capacitor $C_1$. The natural frequency of the blocking oscillator is adjustable by means of the variable resistor $R_1$. Also vertical synchronizing pulses may be applied to the base of transistor $T_1$. Between points A and B there is located a diode $D_1$ which makes it possible for the winding $L_{b1}$ not to be included in the discharge circuit of the capacitor $C_{12}$. In fact, the ohmic resistance of the winding $L_{b1}$ may be comparatively high, resulting in a further increase of the residual voltage $V_r$ which remains across capacitor $C_{12}$ after the end of the flyback. Since the ohmic value of the diode $D_1$ in its conducting state is much lower than that of the winding $L_{b1}$, the provision of the diode $D_1$ constitutes an improvement in this respect. The control voltage developed at point B is now applied through a D.C. coupling to the base of an output transistor $T_3$. The deflection circuit-arrangement shown in FIGURE 1 includes an additional driver transistor $T_2$ which is only necessary if the voltage developed at point B is not sufficient for the complete drive of output transistor $T_3$. If this voltage is sufficient, however, the transistor $T_2$ can be omitted. The transistor $T_2$ is connected as an emitter follower and its emitter resistor $R_{14}$ is connected to a tapping between resistors $R_{15A}$ and $R_{15B}$ in order to ensure that transistor $T_2$ can readily be made conducting at the start of the flyback at the cut-off voltage for the two transistors. This operation will be described more fully hereinafter.

The output transistor $T_3$ is provided with a choke coil LC, and between the collector and the emitter of said transistor there is included a deflection coil $L_y$ connected through a blocking capacitor $C_y$. The sole purpose of capacitor $C_y$ is to remove the D.C. component from the sawtooth current flowing through the deflection coil $L_y$.

As mentioned in the preamble, unless the steps according to the invention are taken, it will be impossible to cut-off the transistors $T_2$ and $T_3$ during the flyback period of the sawtooth voltage developed across the capacitor $C_{12}$. This may be recognized as follows. Let it be assumed that the resistor $R_{16}$ is absent and that capacitor $C_{12}$ is connected directly to earth. Said capacitor is charged through resistor $R_{13}$ and discharged through the diode $D_1$, transistor $T_1$ and resistor $R_2$. Since the diode $D_1$ and the transistor $T_1$ still have certain ohmic values even in the conducting state and also resistor $R_2$ has a mean ohmic value of 2 ohms, it will not be possible for capacitor $C_{12}$ to be discharged completely during flyback and a residual voltage $V_r$ subsists across it. However, since point B is D.C. coupled to the transistors $T_2$ and $T_3$, said residual voltage $V_r$ which constitutes a negative voltage at point B prevents the pnp-transistors $T_2$ and $T_3$ from being cut-off. According to the invention, in order nevertheless to bring about such cutting-off, the resistor $R_{16}$ is provided and the emitter circuit of transistor $T_3$ includes an RC-network comprising the resistors $R_{15A}$ and $R_{15B}$ and a capacitor $C_{14}$. The time constant of this network is as long as possible relative to the period of the sawtooth voltage developed across capacitor $C_{12}$. In the embodiment shown in FIG. 1, the period has a duration of 20 msecs. (corresponding to a recurrence frequency of 50 c./s.) and the time constant of the network $R_{15}$, $C_{14}$ is likewise 20 msecs. However, a complete direct voltage at the emitter of transistor $T_3$ is not obtained since a certain ripple voltage still remains across said network. This ripple voltage acts, however, as a negative feedback voltage for transistor $T_3$ in order to compensate for non-linearities in the sawtooth currents flowing through the coils $L_y$. These non-linearities result from the sawtooth control voltage set up across capacitor $C_{12}$. However, the D.C. component across the network $R_{15}$, $C_{14}$ is sufficient, in combination with the pulsatory voltage developed across resistor $R_{16}$ during the flyback time, to cut-off the transistor $T_2$ as well as the transistor $T_3$.

In the embodiment shown in FIGURE 1, the end of resistor $R_{16}$ which is remote from the capacitor $C_{12}$ is connected to earth. In this case the discharge current of capacitor $C_{12}$ during flyback develops a pulse across resistor $R_{16}$ which renders the end of $R_{16}$ connected to capacitor $C_{12}$ positive to earth. Since the emitter of transistor $T_3$ is negative to earth due to the voltage held by capacitor $C_{14}$, the total voltage developed across resistor $R_{16}$ and capacitor $C_{14}$ is capable of cutting-off the two transistors $T_2$ and $T_3$.

As can be seen from FIG. 1, resistor $R_{14}$ is connected to a tapping on the resistors $R_{15A}$ and $R_{15B}$. The emitter of transistor $T_2$ is thus brought to a voltage which is a little more positive, thus ensuring that transistor $T_2$ and hence also transistor $T_3$ can be immediately released at the end of the flyback period.

However, as can be seen from FIG. 2, it is also possible to connect resistor $R_{16}$ to the emitter of transistor $T_3$. In this case no bias voltage is applied to transistor $T_3$, since the network $C_{12}R_{16}$ is connected between the base of transistor $T_2$ and the emitter of transistor $T_3$. However, in this case the network $R_{15}C_{14}$ is included in the discharge circuit as a voltage source, with a polarity increasing the discharge current of capacitor $C_{12}$ so that during the flyback time, a great discharge current will flow through the discharge circuit. This affords three advantages. First, due to this great discharge current, the capacitor $C_{12}$ can discharge more rapidly than would be possible without the initial voltage source. Secondly, the great discharge current will develop a pulse of great amplitude across the resistor $R_{16}$. This great pulse can exceed the voltage across capacitor $C_{12}$ during the whole flyback time so that it is ensured that the transistors $T_2$ and $T_3$ are cut-off during the flyback time.

Thirdly, it is, to a greater or lesser extent, now possible to bring about a linearity correction, since the voltage developed across capacitor $C_{12}$ during the stroke time is exponential and must therefore be corrected. Assuming that a substantially sawtooth current flows through the deflection coil $L_y$ during the stroke time, then a substantially sawtooth voltage is active between the emitter and collector of transistor $T_3$ during the stroke time since in practice the ohmic character of the coil $L_y$ predominates. If, in the first instance, the capacitor $C_{14}$ is assumed to be omitted, a sawtooth voltage (voltage across $T_3$) plus a constant voltage (supply voltage $-V_{cc}$) is set up across the series-combination of the choke coil $L_c$ and the resistors $R_{15A}$ and $R_{15B}$. If, furthermore, the total resistance $R_{15}$ is small relative to the choke coil $L_c$, a substantially quadratic current flows through said choke coil and through the resistors $R_{15A}$ and $R_{15B}$, which current has its minimum before the start of the stroke time. A substantially parabolic voltage is thus set up across the resistors $R_{15A}$ and $R_{15B}$ which serves to correct the voltage across the charge capacitor $C_{12}$ which varies according to an exponential function. The correction must be such that a sawtooth current of great amplitude and a substantially quadratic current of small amplitude flows through the transistor $T_3$.

The capacitor $C_{14}$ must actually be present because otherwise the voltage source necessary for discharge current to flow through resistor $R_{16}$ would be absent, and secondly also because, without $C_{14}$, the linearity correction would be too great. The choice of $C_{14}$ is thus determined by a good linearity correction and by the fact that a sufficiently great discharge current must flow through $R_{16}$ during the flyback time.

It will be evident from the foregoing that the connection of the end of resistor $R_{16}$ to the emitter of $T_3$, as shown in FIG. 2, instead of to earth, affords several advantages. The charge network comprising resistor $R_{13}$ and capacitor $C_{12}$ is so proportioned that only a very low voltage is developed across capacitor $C_{12}$ during the stroke time. This affords two advantages. First the voltage across capacitor $C_{12}$ approaches a linear function since only a very small portion of the total exponential voltage available is used, that is to say the beginning thereof which has a comparatively steep wave form so that the linearity correction need be small, and hence $C_{14}$ may be chosen with a maximum value. Secondly, the low voltage developed across capacitor $C_{12}$ may readily be exceeded by the pulse developed across the resistor $R_{16}$ during the flyback time.

A practical set of values and components for the arrangement of FIGS. 1 and 2 is given below by way of illustration for a vertical deflection circuit of a 405-line or 625-line television receiver capable of giving 110° deflection with a picture tube accelerating voltage of 18 kilovolts.

*Table*

| | |
|---|---|
| Supply voltage ($V_{cc}$) | 15 volts. |
| Transistors $T_1$ and $T_2$ | Mullard type OC 81. |
| Transistor $T_3$ | Mullard type OC 28. |
| Diode $D_1$ | Mullard type OA 10 or OA 47. |
| Resistor $R_1$ | 1,000 ohms. |
| Resistor $R_2$ | 2 ohms (N.T.C.). |
| Resistor $R_{13}$ | 2,000 ohms. |
| Resistor $R_{14}$ | 180 ohms. |
| Resistor $R_{15A}$ | 1 ohm. |
| Resistor $R_{15B}$ | 3.3 ohms. |
| Resistor $R_{16}$ | 15 ohms. |
| Capacitor $C_1$ | 4 $\mu$f. |
| Capacitor $C_{12}$ | 500 $\mu$f. |
| Capacitor $C_y$ | 1,000 $\mu$f. |
| Capacitor $C_{14}$ | 5,000 $\mu$f. |
| Choke $L_c$ | 50 mh. at 350 mamps; 4 to 5 ohms. |
| Deflection coil $L_y$ | 21 mh; 9 ohms. |
| Winding $L_{b1}$ | 360 turns; diameter of the wire 0.08 mm.; 25 ohms. |
| Winding $L_{b2}$ | 360 turns; diameter of the wire 0.08 mm.; 25 ohms. |

In this example $L_{b1}$ and $L_{b2}$ are bifilar windings and each have the following inductance values:

306 mh. at 120 c./s., 0.5 volt R.M.S., 3 mamps
42 mh. at 120 c./s., 0.5 volt R.M.S., 440 mamps FIG. 3 illustrates a modification of the blocking oscillator of FIGS. 1 and 2 in which diode $D_1$ is omitted and, consequently, the resistor $R_1$ and the winding $L_{b1}$ are connected to point B instead of to the conductor leading to the supply voltage of $-V$ volts. The remainder of the circuit can be the same as for FIGS. 1 and 2 except: (1) resistor $R_{15B}$ must be increased from 3.3 ohms to about 6.9 ohms and (2) the windings $L_{b1}$ and $L_{b2}$ must be proportioned as follows:

Winding $L_{b1}$=20 mh. (at 3 volts, 100 c./s.) and 4.7 ohms
Winding $L_{b2}$=660 mh. (at 3 volts, 100 c./s.) and 110 ohms It is to be noted that, according to the invention, it is also possible to delay the beginning of the conducting state of the transistors $T_2$ and $T_3$ relative to the start of the flyback time. This can be done by giving $R_{16}$ a value higher than the specified value of 15 ohms, or by connecting the end of resistor $R_{14}$ remote from the emitter of transistor $T_3$ directly to the emitter of transistor $T_3$. By doing this and choosing the correct values of inductance $L_c$ and deflection coil $L_y$ sufficient energy recovery can be obtained for supplying the first third of the scanning stroke. This can result in a saving of mean current from the power supply of approximately 25% and also results in a reduction in the size of the choke coil $L_c$. Linearity, however, is not quite so good as when the transistors $T_2$ and $T_3$ are made conductive right at the start of the stroke time.

What is claimed is:

1. A deflection system for producing a sawtooth current wave in a deflection coil comprising a transistor output amplifier including first and second electrodes forming an input circuit, said output amplifier further comprising an output circuit coupled to said deflection coil, a charge network comprising the series combination of a capacitor and a charging impedance for supplying a sawtooth drive voltage to said output amplifier, means providing a direct current coupling from said charge network to said first electrode, a discharge circuit for periodically discharging said capacitor comprising a semiconductor oscillator stage having a direct current connection to said charge network, said discharge circuit producing a small residual voltage of a polarity which tends to produce conduction in said output amplifier, and means for compensating said residual voltage so as to produce cut-off of said output amplifier during the flyback period of the sawtooth wave comprising a resistor connected in series with said charging capacitor and included in said discharge circuit and a resistance-capacitance network coupled to said second electrode so as to supply a substantially constant direct current voltage thereto.

2. Apparatus as described in claim 1 wherein said direct current coupling further comprises a transistor emitter follower stage having its base electrode connected to said charge network and its emitter electrode connected to said first electrode thereby to transfer substantially unaltered the voltage level and the sawtooth drive voltage waveform, said apparatus further comprising means connecting said resistance-capacitance network between said second electrode and a point of reference potential so as to provide a D.C. current path to said second electrode, and means connecting said emitter electrode to a tap on said D.C. current path.

3. Apparatus as described in claim 1 wherein said first and second electrodes comprise the base and emitter electrodes, respectively, of said output transistor, said resistance-capacitance network comprising the parallel connection of a second resistor and a second capacitor connected between said emitter electrode and one terminal of said charge circuit.

4. A deflection system for producing a sawtooth current wave in a deflection coil comprising a transistor output amplifier including base and emitter electrodes and an output circuit coupled to said deflection coil, a charge network comprising a capacitor for supplying a sawtooth drive voltage to said output amplifier, a discharge circuit for periodically discharging said capacitor comprising a semiconductor oscillator stage having a direct current connection to said charge network, said discharge circuit producing a small residual voltage of a polarity which tends to produce conduction in said output amplifier, a direct current connection from said charge network to said output amplifier base electrode which transfers substantially unaltered the voltage level and the sawtooth drive voltage waveform, and means for compensating said residual voltage so as to produce cut-off in said output amplifier during the flyback period of the sawtooth wave comprising a resistor connected in series with said capacitor and included in said discharge circuit and the parallel circuit combination of a second resistor and a second capacitor connected to said emitter electrode and having a time constant at least as long as the period of said sawtooth current wave.

5. Apparatus as described in claim 4 further comprising means for connecting said parallel circuit combination comprising said second resistor and said second capacitor between said emitter electrode and a point of reference potential so as to produce at said emitter electrode a voltage having a direct current component and a varying component, and means connecting said series resistor-capacitor circuit to said point of reference potential.

6. Apparatus as described in claim 4 wherein said second resistor is connected to provide a D.C. current path for said emitter electrode, and means connecting said series resistor-capacitor circuit to a point on said D.C. current path thereby to effectively include at least a portion of said parallel circuit combination in said discharge circuit.

7. A deflection system for producing a sawtooth current wave having a given period in a deflection coil, comprising a transistor output amplifier having an input electrode and first and second electrodes for establishing a current path in said transistor, means coupling said first electrode to said deflection coil, a charge network comprising a first capacitor for supplying a sawtooth drive voltage to said output amplifier, a discharge circuit for periodically discharging said capacitor comprising a semiconductor oscillator stage having a direct current connection to said charge network, means providing a direct current connection from said charge network to said input electrode, a first resistor connected in said discharge circuit in series circuit with said first capacitor, a second resistor and a second capacitor connected in a parallel circuit having a substantial time constant relative to said sawtooth period, means connecting said parallel circuit to said second electrode to provide a D.C. current path for said output transistor, and means connecting at least a portion of said parallel circuit in said discharge circuit.

8. Apparatus as described in claim 7 wherein said connecting means comprises a connection from said series resistor-capacitor circuit to a point on said D.C. current path.

9. Apparatus as described in claim 8 wherein said second electrode is the emitter of said output transistor and said connection is directly from said series circuit to said emitter thereby to include said parallel circuit in series with said first resistor and said first capacitor in said discharge circuit.

10. Apparatus as described in claim 8 wherein said direct current connection means between said charge network and said input electrode comprises a transistor connected in emitter follower configuration and adapted to transfer substantially unaltered the voltage level and sawtooth drive voltage waveform.

11. Apparatus as described in claim 10 further comprising a third resistor connected between the emitter of said emitter follower transistor and a second point on said D.C. current path.

12. Apparatus as described in claim 7 wherein said parallel circuit is connected between said second electrode and a point of reference potential and said connecting means comprises means for connecting said parallel circuit in series with said first resistor and said first capacitor in said discharge circuit.

13. Apparatus as described in claim 7 wherein said connecting means comprises means connecting at least a portion of said second resistor in series with said first resistor and said first capacitor in said charge network and further connecting said portion of said second resistor in series with said first resistor and said first capacitor in said discharge circuit.

14. A deflection system for producing a sawtooth current wave in a deflection coil, comprising a transistor output amplifier having base and emitter electrodes and an output circuit coupled to said deflection coil, a charge network comprising a first capacitor for supplying a sawtooth drive voltage to said output amplifier, a discharge circuit for periodically discharging said capacitor comprising a semiconductor oscillator stage having a direct current connection to said charge network, means providing a direct current connection from said charge network to said base electrode, a first resistor connected in said discharge circuit in series circuit with said first capacitor, a second resistor and a second capacitor connected in a parallel circuit, means connecting said parallel circuit to said emitter electrode so as to provide a D.C. current path for said emitter electrode, and means connecting said series circuit to a tap on said D.C. current path thereby to include at least a portion of said parallel circuit in said discharge circuit for said first capacitor.

15. A deflection system for producing a sawtooth current wave having a given period in a deflection coil, comprising a transistor output amplifier having base and emitter electrodes and an output circuit coupled to said deflection coil, a charge network for suplying a sawtooth drive voltage to said output amplifier comprising a first capacitor and a first resistor connected in a series circuit, means providing a direct current coupling from said charge network to said base electrode, a second resistor and a second capacitor connected in parallel to said emitter electrode, semiconductor switching means, a direct current connection between said switching means and said charge network, and means connecting said parallel circuit to said charge network to provide a discharge circuit for said first capacitor comprising, in series circuit, said semiconductor switching means, said direct current connection, said first capacitor, said first resistor, and said parallel circuit comprising said second resistor and said second capacitor.

References Cited by the Examiner

UNITED STATES PATENTS

| | | | |
|---|---|---|---|
| 2,694,161 | 11/1954 | Holst | 315—29 |
| 2,820,894 | 1/1958 | Schrecongost | 315—29 |

DAVID G. REDINBAUGH, *Primary Examiner.*

JOHN KOMINSKI, *Examiner.*

JOHN E. BECK, *Assistant Examiner.*